INVENTOR
MARVIN B. PREEMAN
BY HIS ATTORNEYS
HARRIS, KIECH RUSSELL & KERN

Oct. 8, 1963  M. B. PREEMAN  3,106,384
ASPHALT MIXING PLANT DUST RETURN SYSTEM
Filed March 27, 1961  2 Sheets-Sheet 2
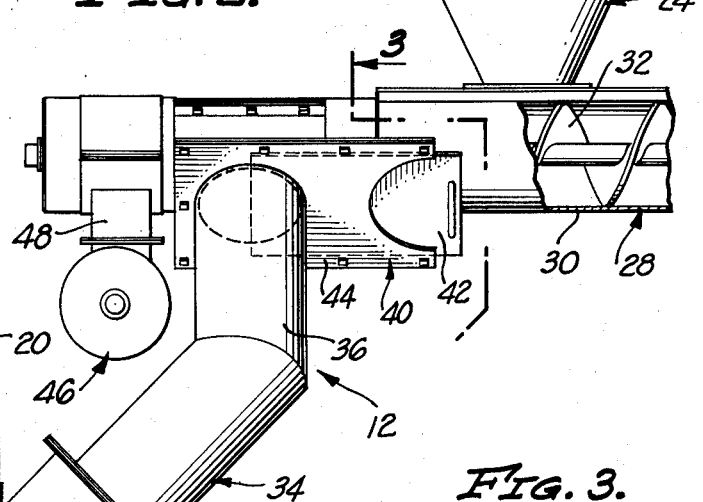
FIG. 2.
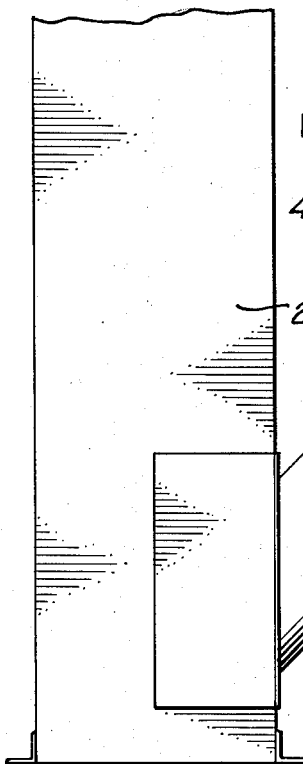
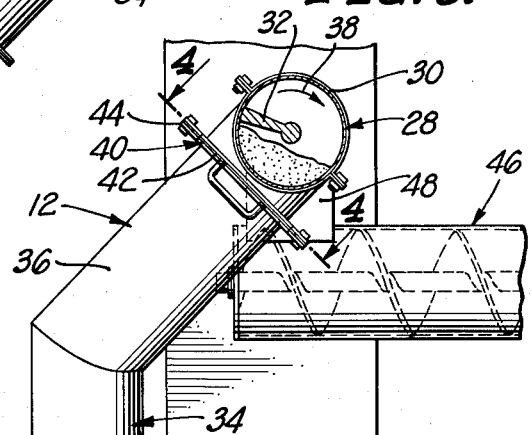
FIG. 3.
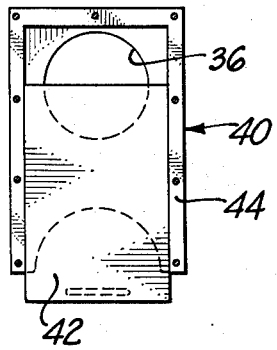
FIG. 4.
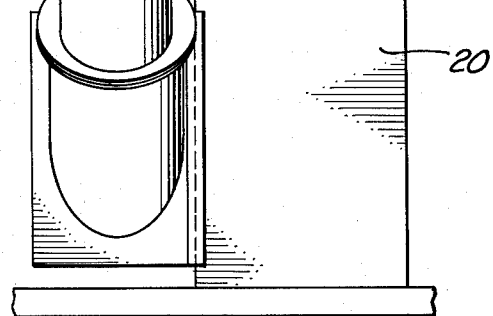
INVENTOR
MARVIN B. PREEMAN
BY HIS ATTORNEYS
HARRIS, KIECH, RUSSELL & KERN United States Patent Office 3,106,384
Patented Oct. 8, 1963

3,106,384
ASPHALT MIXING PLANT DUST RETURN SYSTEM
Marvin B. Preeman, Los Angeles, Calif., assignor to Standard Steel Corporation, Los Angeles, Calif., a corporation of California
Filed Mar. 27, 1961, Ser. No. 98,611
4 Claims. (Cl. 259—159)

The present invention relates in general to an asphalt mixing plant for producing aggregate-asphalt mixes for paving purposes, and the like, and, more particularly, to an apparatus having dust return means for adding to the mix fines emanating from an aggregate drier forming part of the plant and collected by a dust collecting means forming part thereof.

A primary object of the invention is to provide a dust return system having valve means regulating flow through the dust return means for directly controlling the proportion of fines added to the aggregate-asphalt mix. Expressed differently, a primary object of the invention is to control the amount of dust being returned, instead of the amount being rejected.

Another object is to provide a dust discharge means, for discharging excess fines, which is connected in parallel with the valve means for controlling the amount of dust returned, whereby the amount of dust returned is controlled directly, instead of by controlling the amount of dust rejected.

A further object is to provide a dust return means which includes a generally horizontal screw conveyor communicating with and receiving dust from the dust collecting means, means for adding dust to the aggregate-asphalt mix including a duct inclined at an angle from the horizontal and communicating at its upper end with the screw conveyor, and valve means in and regulating flow through such duct for directly controlling the amount of dust added to the aggregate-asphalt mix. The inclined duct mentioned insures adding to the mix a uniform cross section of all fine sizes, which is an important feature.

A further object of the invention is to provide a dust return system wherein the dust added to the aggregate-asphalt mix is introduced into an elevator forming part of a conveying means for conveying aggregate from the drier to the mixing means.

The foregoing objects, advantages, features and results of the present invention together with various other objects, advantages, features and results thereof which will be evident to those skilled in the asphalt mixing plant art in the light of this disclosure, may be achieved with the exemplary embodiment of the invention described in detail hereinafter and illustrated in the accompanying drawings, in which:

FIG. 2 is an enlarged, elevational view of a dust return system of the invention;

FIG. 3 is a view, partially in section and partially in elevation, taken along the arrowed line 3—3 of FIG. 2; and FIG. 4 is a sectional view taken along the arrowed line 4—4 of FIG. 3 of the drawings.

Figure 1:
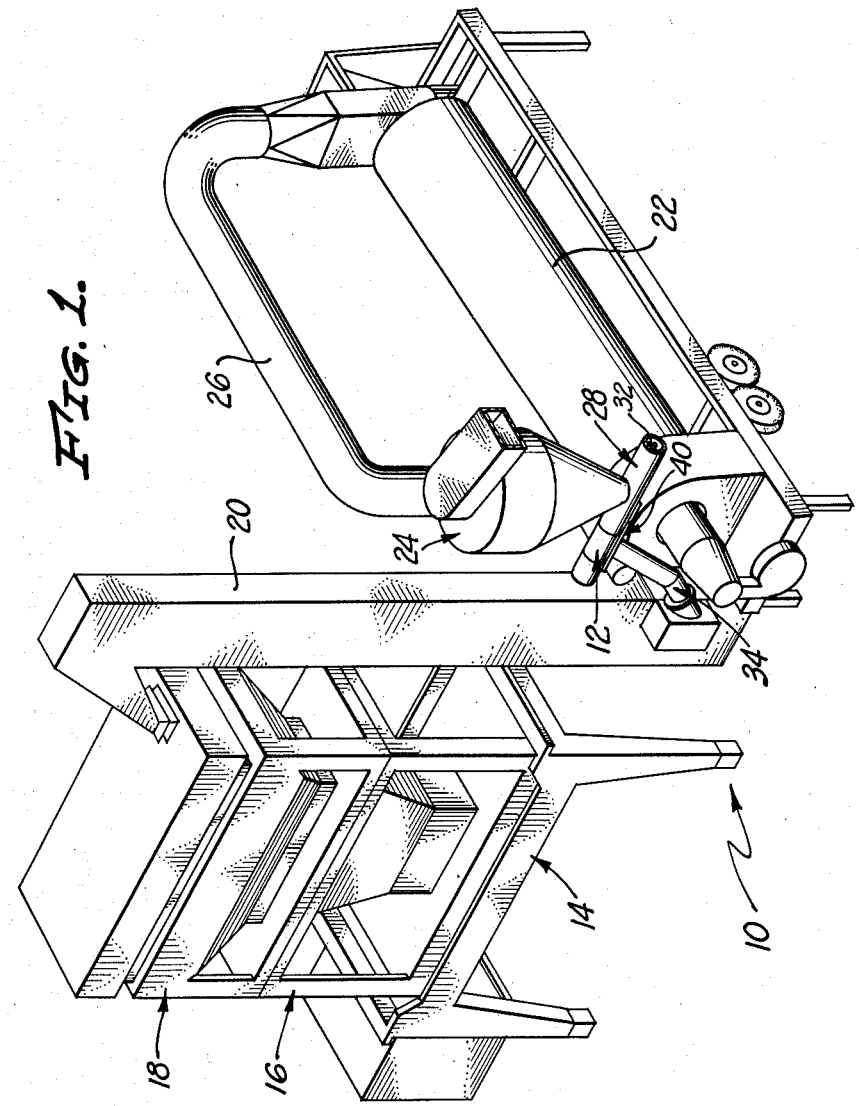
FIG. 1 is a semidiagrammatic perspective view of an asphalt mixing plant which embodies the invention.

Referring initially to FIG. 1 of the drawings, illustrated therein is a typical asphalt mixing plant 10 with which the dust return system of the invention, designated generally by the numeral 12, may be used. The mixing plant 10 is described in more detail in my co-pending patent application Serial No. 818,697, filed June 8, 1959, now abandoned, so that it needs be described only briefly herein.

The mixing plant 10 includes a tower comprising base, intermediate and upper sections 14, 16 and 18. The upper section 18 includes means, not shown, for grading aggregates according to size and for discharging the graded aggregates into different bins, not shown. The intermediate section 16 includes means, not shown, for weighing out aggregates in the desired proportions from the upper or bin section 18 and includes means, not shown, for mixing same with asphalt obtained from a suitable source, not shown, forming part of the plant 10. The intermediate section 16 also includes means, not shown, for discharging the resulting aggregate-asphalt mix into a truck therebeneath.

Dried aggregates are supplied to the bin section 18 by an elevator 20 located adjacent the tower formed of the sections 14, 16 and 18. The lower end of the elevator 20 communicates with the aggregate discharge end of a conventional aggregate drier 22. Fines discharged by the dust discharge end of the drier 22 are collected in a dust collecting means 24 which may include one or more centrifugal or cyclone separators. A duct 26 connects the dust discharge end of the drier 22 to the dust collecting means 24. It will be understood that counterflow of the aggregates being dried and the drying medium occurs within the drier 22, whereby the aggregate and dust discharge ends of the drier are the opposite ends thereof.

As shown in FIG. 1 of the drawings, and as best shown in FIGS. 2 and 3 thereof, the dust return system 12 includes a generally horizontal screw conveyor 28 which communicates with and receives fines from the separator or separators constituting the dust collecting means 24. As is conventional, the screw conveyor 28 includes a housing 30 within which rotates a screw 32 driven in any suitable manner, not shown.

Communicating with the screw conveyor 28 downstream from the dust collecting means 24 is a dust return means 34 which leads to the lower end of the elevator 20 so that fines from the dust collecting means are added to the aggregate-asphalt mix by way of the elevator, the grading and bin section 18, and the weighing and mixing section 16. The dust return means 34 includes an inclined duct 36 the upper end of which communicates with the screw conveyor housing 30 on the side thereof toward which the fines are carried by the screw 32, the direction of rotation of the latter being as indicated by the arrow 38 in FIG. 3 of the drawings. With this construction, a uniform cross section of all fine sizes is deliverable into the duct 36, instead of merely the largest or smallest fines.

Interposed in the duct 36 is a valve means 40 regulating the flow of fines through the dust return means 34 for controlling the quantity of fines added to the aggregate-asphalt mix. The valve means 40 is shown simply as comprising a gate valve 42 slidable in a guide 44 which extends transversely across the duct 36.

Any excess or surplus fines which do not enter the duct 36 are discharged from the end of the screw conveyor 28 into another screw conveyor 46 through an interconnecting chute 48. Thus, the excess-dust discharge means formed by the screw conveyor 46 is connected in parallel with the valve means 40, the screw conveyor 46 leading to a suitable point of disposal for surplus fines.

With the foregoing construction, since the point at which the fines to be added to the asphalt-aggregate mix are drawn off upstream from the discharge means provided by the screw conveyor 46, the amount of dust being returned is directly controlled by the valve means 40, instead of being indirectly controlled by controlling the amount of dust rejected. This is an important feature since it provides more accurate control of the amount of returned dust being delivered to the mix.

When the asphalt mixing plant 10 is initially placed in operation, the first aggregate-asphalt mix is analyzed to determine whether the proportion of fines therein is proper, or too low, or too high. If too low, or too high, the position of the gate valve 42 is then adjusted accordingly. Once the proper gate valve position has been determined, no further adjustment is necessary so long as the proportion of fines in the source of aggregate is constant.

Although an exemplary embodiment of the invention has been disclosed herein for purposes of illustration, it will be understood that various changes, modifications and substitutions may be incorporated in such embodiment without departing from the spirit of the invention as defined by the following claims.

I claim:

1. In an asphalt mixing plant, the combination of: an aggregate drier; mixing means communicating with said drier for producing an aggregate-asphalt mix; dust collecting means communicating with said drier; dust return means communicating with said dust collecting means and said mixing means for adding dust collected by said dust collecting means to said aggregate-asphalt mix; valve means regulating flow from said dust collecting means to said mixing means through said dust return means for directly controlling the amount of dust added to said aggregate-asphalt mix; and dust discharge means connected in parallel with said valve means for discharging excess dust.

2. In an asphalt mixing plant, the combination of: an aggregate drier; mixing means communicating with said drier for producing an aggregate-asphalt mix; dust collecting means communicating with said drier; a generally horizontal screw conveyor communicating with and receiving dust from said dust collecting means; means communicating with said screw conveyor and said mixing means for adding dust from said dust collecting means to said aggregate-asphalt mix, including a duct inclined at an angle from the horizontal and communicating at its upper end with said screw conveyor; valve means in and regulating flow through said duct for directly controlling the amount of dust added to said aggregate-asphalt mix; and dust discharge means communicating with said screw conveyor downstream from said duct and connected in parallel with said duct for discharging excess dust.

3. In an asphalt mixing plant, the combination of: mixing means for producing an aggregate-asphalt mix; an aggregate drier; means for conveying aggregate from said drier to said mixing means, including an elevator; dust collecting means communicating with said drier; dust return means communicating with said dust collecting means and said elevator for adding dust collected by said dust collecting means to said aggregate-asphalt mix; valve means regulating flow from said dust collecting means to said elevator through said dust return means for directly controlling the amount of dust added to said aggregate-asphalt mix; and dust discharge means connected in parallel with said valve means for discharging excess dust.

4. In an asphalt mixing plant, the combination of: an aggregate drier; mixing means communicating with said drier for producing an aggregate-asphalt mix; dust collecting means communicating with said drier; a generally horizontal screw conveyor housing communicating with and receiving dust from said dust collecting means; a screw conveyor rotatable in said housing; means communicating with said housing and said mixing means for adding dust from said dust collecting means to said aggregate-asphalt mix, including a sloping duct inclined downwardly from said housing and communicating at its upper end with said housing on the side thereof toward which material being conveyed through said housing by said screw conveyor is circumferentialy displaced by said screw conveyor; and valve means in and regulating flow through said duct for directly controlling the amount of dust added to said aggregate-asphalt mix.

References Cited in the file of this patent

UNITED STATES PATENTS

| | | |
|---|---|---|
| 1,215,560 | Leake | Feb. 13, 1917 |
| 1,733,410 | Johnson | Oct. 29, 1929 |
| 2,027,958 | Carter | Jan. 14, 1936 |
| 2,397,581 | Waters | Apr. 2, 1946 |
| 2,741,796 | King | Apr. 17, 1956 |
| 2,814,204 | Mayle | Nov. 26, 1957 |
| 2,886,902 | Christian | May 19, 1959 |
| 2,945,683 | Martinson | July 19, 1960 |